US010628518B1

(12) United States Patent
Francois (10) Patent No.: US 10,628,518 B1
(45) Date of Patent: Apr. 21, 2020

(54) LINKING A VIDEO SNIPPET TO AN INDIVIDUAL INSTRUCTION OF A MULTI-STEP PROCEDURE (71) Applicant: Silenceux Francois, North Lauderdale, FL (US)

(72) Inventor: Silenceux Francois, North Lauderdale, FL (US)

( * ) Notice: Subject to any disclaimer, the term of this patent is extended or adjusted under 35 U.S.C. 154(b) by 496 days.

(21) Appl. No.: 14/993,164

(22) Filed: Jan. 12, 2016

(51) Int. Cl.
| G06F 17/24 | (2006.01) |
| G06F 17/22 | (2006.01) |
| G06F 3/0484 | (2013.01) |
| G11B 27/30 | (2006.01) |
| G09B 19/00 | (2006.01) |

(52) U.S. Cl.
CPC ...... *G06F 17/2235* (2013.01); *G06F 3/04842* (2013.01); *G06F 17/24* (2013.01); *G09B 19/00* (2013.01); *G11B 27/30* (2013.01)

(58) Field of Classification Search
CPC .. G06F 17/2235; G06F 3/04842; G09B 19/00
See application file for complete search history.

(56) References Cited

U.S. PATENT DOCUMENTS

| 6,084,581 | A | * | 7/2000 | Hunt | G06Q 30/06 348/E7.071 |
| 6,119,117 | A | * | 9/2000 | Yoda | G06F 17/30011 707/694 |
| 9,277,255 | B1 | * | 3/2016 | Rowe | H04N 21/2407 |
| 9,510,026 | B1 | * | 11/2016 | Hayden | H04N 21/23106 |
| 2005/0132420 | A1 | * | 6/2005 | Howard | G06F 3/017 725/135 |
| 2008/0119132 | A1 | * | 5/2008 | Rao | G06Q 30/02 455/3.04 |
| 2008/0181575 | A1 | * | 7/2008 | Girard | H04N 7/17318 386/244 |
| 2009/0259687 | A1 | * | 10/2009 | Do | G06F 17/30867 |
| 2010/0332549 | A1 | * | 12/2010 | Nichols | G06F 17/30067 707/802 |
| 2013/0052616 | A1 | * | 2/2013 | Silverstein | G09B 19/00 434/127 |
| 2013/0171304 | A1 | * | 7/2013 | Huntley | G06Q 50/00 426/231 |
| 2014/0170275 | A1 | * | 6/2014 | Bordin | G09B 19/24 426/233 |
| 2014/0263640 | A1 | * | 9/2014 | Heit | G06K 7/00 235/435 |
| 2014/0272817 | A1 | * | 9/2014 | Park | G09B 5/02 434/127 |

(Continued)

*Primary Examiner* — Wilson W Tsui
(74) *Attorney, Agent, or Firm* — Patents on Demand P.A.; Brian K. Buchheit (57) ABSTRACT

An instruction of a multi-step procedure can be identified. The instruction can be a directive for performing an action associated with the procedure. The multi-step procedure can be a cooking recipe comprising an ordered set of instructions. A video segment within a data store can be selected. The segment can include a start index and an end index. The time difference between the start index and end index can conform to a previously established length threshold. The video segment of the video can be linked to the instruction of the multi-step procedure. The linking can include a pointer to the video and the video segment. The pointer can be within a computer readable medium.

20 Claims, 6 Drawing Sheets

(56) References Cited

U.S. PATENT DOCUMENTS

| | | | |
|---|---|---|---|
| 2014/0317501 A1* | 10/2014 | Brasseur | G06F 8/65 |
| | | | 715/702 |
| 2015/0032572 A1* | 1/2015 | Spano a/k/a Calvi | |
| | | | G06Q 30/0623 |
| | | | 705/26.61 |
| 2015/0073940 A1* | 3/2015 | Jo | G06Q 30/0625 |
| | | | 705/26.62 |
| 2015/0142889 A1* | 5/2015 | Sakata | H04L 65/403 |
| | | | 709/204 |
| 2015/0170325 A1* | 6/2015 | Abecassis | G06T 1/20 |
| | | | 345/2.1 |
| 2015/0290795 A1* | 10/2015 | Oleynik | G05B 19/42 |
| | | | 700/257 |
| 2016/0170939 A1* | 6/2016 | Chen | G06Q 30/0643 |
| | | | 705/27.2 |
| 2016/0171659 A1* | 6/2016 | Caissy | G06T 11/60 |
| | | | 345/659 |
| 2016/0253922 A1* | 9/2016 | Kremen | G09B 5/06 |
| | | | 434/127 |
| 2016/0328772 A1* | 11/2016 | Hubman | G06Q 30/06 |
| 2016/0372005 A1* | 12/2016 | Bajpai | G09B 19/0092 |
| 2017/0011649 A1* | 1/2017 | Lee | G09B 5/02 |

* cited by examiner

LINKING A VIDEO SNIPPET TO AN INDIVIDUAL INSTRUCTION OF A MULTI-STEP PROCEDURE

BACKGROUND

The present invention relates to the field of multi-step processes and, more particularly, to linking a video snippet to an individual instruction of a multi-step procedure.

As technology improves user's lives, users are frequently turning to traditional chores for sources of entertainment. One such reimaging of conventionally mundane activities is cooking. Many users are cooking as a hobby and often socialize with others through online and real world communities. One main tool that has become a cornerstone for budding amateur cooks is recipe applications and websites. Often, these websites can provide complex and unfamiliar instructions within common recipes. It is not uncommon for users to make mistakes when these complex and unfamiliar instructions are implemented.

BRIEF SUMMARY

One aspect of the present invention can include a system, a computer program product, and a method for linking a video snippet to an individual instruction of a multi-step procedure. An instruction of a multi-step procedure can be identified. The instruction can be a directive for performing an action associated with the procedure. The multi-step procedure can be a cooking recipe comprising an ordered set of instructions. A video segment within a data store can be selected. The segment can include a start index and an end index. The time difference between the start index and end index can conform to a previously established length threshold. The video segment of the video can be linked to the instruction of the multi-step procedure. The linking can include a pointer to the video and the video segment. The pointer can be within a computer readable medium.

Another aspect of the present invention can include a computer program product, a method, and a system for linking a video snippet to an individual instruction of a multi-step procedure. A recipe engine can be able to identify a recipe within an electronic computer readable medium. The recipe can be an ordered set of instructions. The engine can be configured to link a video segment of a digital video to an instruction of the recipe. The linking can include a pointer to the video and the video segment. The pointer can be stored within a computer readable medium. A data store can be configured to persist a recipe and the video.

DETAILED DESCRIPTION

The present disclosure is a solution for linking a video snippet to an individual instruction of a multi-step procedure. In the solution, a multi-step procedure such as a recipe can be identified. The procedure can include recipes associated with preparing food, cooking food, and/or presenting food. For example, the recipe can be identified during a recipe input process performed by a user within a recipe catalog system. In one instance, each instruction can be linked with a video snippet, a short video providing additional visual information associated with the instruction. For example, a step for browning chicken breasts on a skillet can be associated with a three second video of browned chicken breasts in a skillet. In one embodiment, the multi-step procedure can be uploaded and/or viewed via a cooking recipe based mobile application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
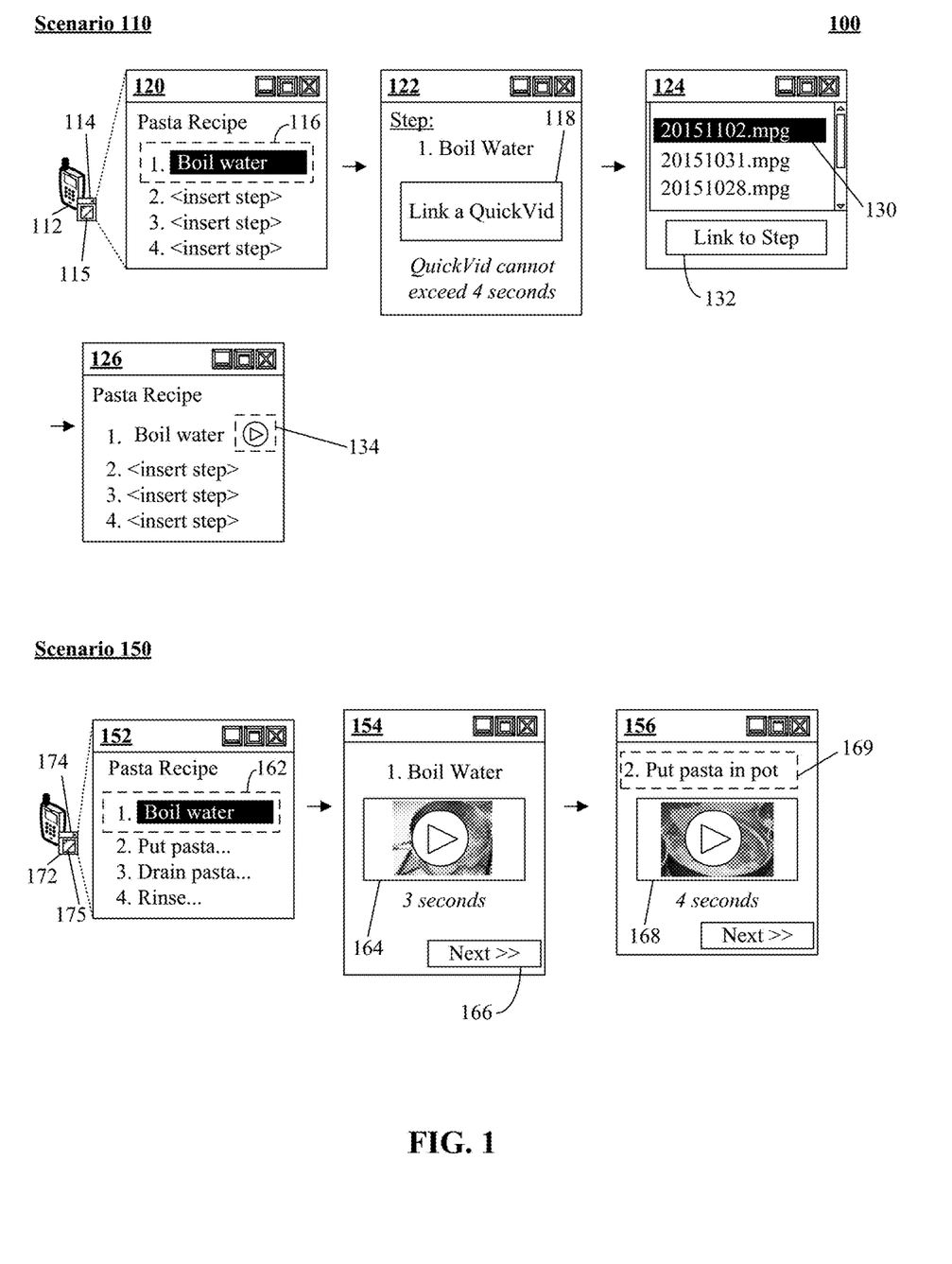
FIG. 1 is a schematic diagram illustrating a set of scenarios for linking a video snippet to an individual instruction of a multi-step procedure in accordance with an embodiment of the inventive arrangements disclosed herein.

FIG. 1 is a schematic diagram illustrating a set of scenarios 110, 150 for linking video snippets to individual instructions of a multi-step procedure in accordance with an embodiment of the inventive arrangements disclosed herein. Scenarios 110,150 can be performed in the context of method 200 and/or system 300.

In scenario 110, a recipe 115 input process can include a set of screens 120-126. The screens 120-126 can include interfaces and/or interface elements permitting the linking of a video snippet to an instruction of the recipe 115. In the scenario, screens 120-126 can appear in order and/or out of order depending on user interaction. In one embodiment, screens 120-126 can be a set of screens of a Web-based recipe application of a cooking based Website. For example, the screens 120-126 can be screens of a FOOD NETWORK website which permit users to submit recipes and link a short video of less than five seconds to an instruction of the recipe.

In scenario 110, a set of screens 120-126 of a mobile application can permit a user to link a video snippet 130 with an instruction 116 of a multi-step procedure 115. Screens 120-126 can be presented within the interface 114 of a computing device 112. For example, screens 120 can be a set of screens for creating a recipe within a cooking recipe mobile application. Screen 120 can present one or more instructions 116 of the multi-step procedure 115. For example, instructions of the multi-step procedure 115 can be presented in an ordered list within the screen 120. In screen 120, an instruction 116 of the multi-step procedure 115 can be selected. Selection of instruction 116 can trigger screen 122 to be presented. Screen 122 can present information associated with the instruction 116 including, but not limited to, additional information, metadata, and the like. In one instance, screen 122 can permit linking of a video snippet 130 with the instruction 116. In the instance, selection of an interactive interface element 118 can trigger a video selection screen 124 to be presented. For example, when a user selects a "Link a QuickVid" button within screen 122, a photo reel on their mobile phone (e.g., or cloud storage) can be presented. In screen 124, a selected video snippet 130 can be linked to the instruction 116 responsive to the selection of the snippet 130 and/or interactive interface element 132. For example, when a user selects a "Link to Step" button within screen 124, the video snippet 130 can be uploaded and linked to instruction 116. In one embodiment, screen 126 can be presented responsive to selection of snippet 130. In the embodiment, screen 126 can present an icon 134 next to the instruction 116 to indicate a video snippet 130 is associated with the instruction 116. It should be appreciated that each instruction of the multi-step procedure 115 can be inputted utilizing screens 120-126 and/or additional screens. It should be understood that procedure 115 and/or instructions 116 can be validated, evaluated, and/or reviewed programmatically and/or by a human agent.

In scenario 150, a recipe 150 presentation process can include a set of screens 152-156. The screens 152-156 can include interfaces and/or interface elements permitting the presentation of a linked video snippet of an instruction of the recipe 175. In the scenario, screens 152-156 can appear in order and/or out of order depending on user interaction. In one embodiment, screens 152-156 can be a set of screens of a Web-based recipe application of a cooking based Website. For example, the screens 120-126 can be screens of a RACHELRAY.COM website which permit users to view user submitted recipes and see a short video of less than seven seconds previously linked to an instruction of the recipe.

In scenario 150, a set of screens 152-156 can present one or more instructions 162 from a multi-step procedure 175. Screens 152-156 can be presented within the interface 174 of a computing device 172. For example, screens 152-156 can be a set of screens for viewing a recipe within a cooking recipe mobile application. Screen 152 can present one or more instructions 162 of the multi-step procedure 175. For example, instructions of the multi-step procedure 175 can be presented in an ordered list within the screen 152. In screen 152, an instruction 162 of the multi-step procedure 175 can be selected. Selection of instruction 162 can trigger screen 154 to be presented. In screen 154, instructions for instruction 162, a linked video snippet 164 and the like can be presented. In one embodiment, selection of the video snippet 164 can trigger playback of video snippet within screen 154. For example, when a user selects snippet 164, the three second video can be played back within the interface 154. Selection of an interface element 166 can advance through the multi-step procedure 175. For example, selecting a "next" button within screen 154 can present screen 156. In screen 156, a different instruction of 169 of procedure 175 can be presented. It should be appreciated that selection of instruction can trigger presentation of video snippet and/or instruction. It should be appreciated that video playback can automatically stop at each step and be manually triggered to continue upon interaction with the interface 152, 154, 156.

Screen 156 can present instruction 169 instructions, description, video snippet 168, and the like. It should be appreciated that procedure can be advanced via any traditional and/or proprietary mechanism including, but not limited to, gesture, voice control, and the like.

Drawings presented herein are for illustrative purposes only and should not be construed to limit the invention in any regard. It should be appreciated that snippet 130, 164, 168 can be constrained to any arbitrary length, file size, encoding type, and the like. In one instance, a threshold can be utilized to establish to limit the length of the snippet 130, 164, 168 which can be linked to an instruction. In the instance, threshold can be manually and/or automatically established from historic user preferences, system settings, and the like. For example, snippet 130 upload can be limited to videos of two seconds or less. In one embodiment, scenario 110 can include screens for capturing video snippets of a predetermined length. In the embodiment, length can be constrained by a user selection, previously established threshold, and the like.

As used herein, a recipe 115, 175 can be a set of ordered instructions that describes how to prepare or make a culinary dish. It should be appreciated that recipe 115, 175 can include elements including, but not limited to, a name, a duration, an ingredient list, an equipment list, a set of ordered instructions, a serving size yield, and the like. In one instance, recipe 115, 175 can be an electronic recipe stored within an electronic catalog of recipes. In one embodiment, a multi-step procedure can be a recipe, series of recipes, and the like.

It should be appreciated that snippet 130, 164, 168 can include audio or can lack audio. In one instance, a geo-location capability (e.g., GPS of device 112) can be leveraged to trigger a prompt to be presented within interface 114. In the instance, a notification to record a snippet can be presented when a user reaches a previously established destination.

Figure 2:
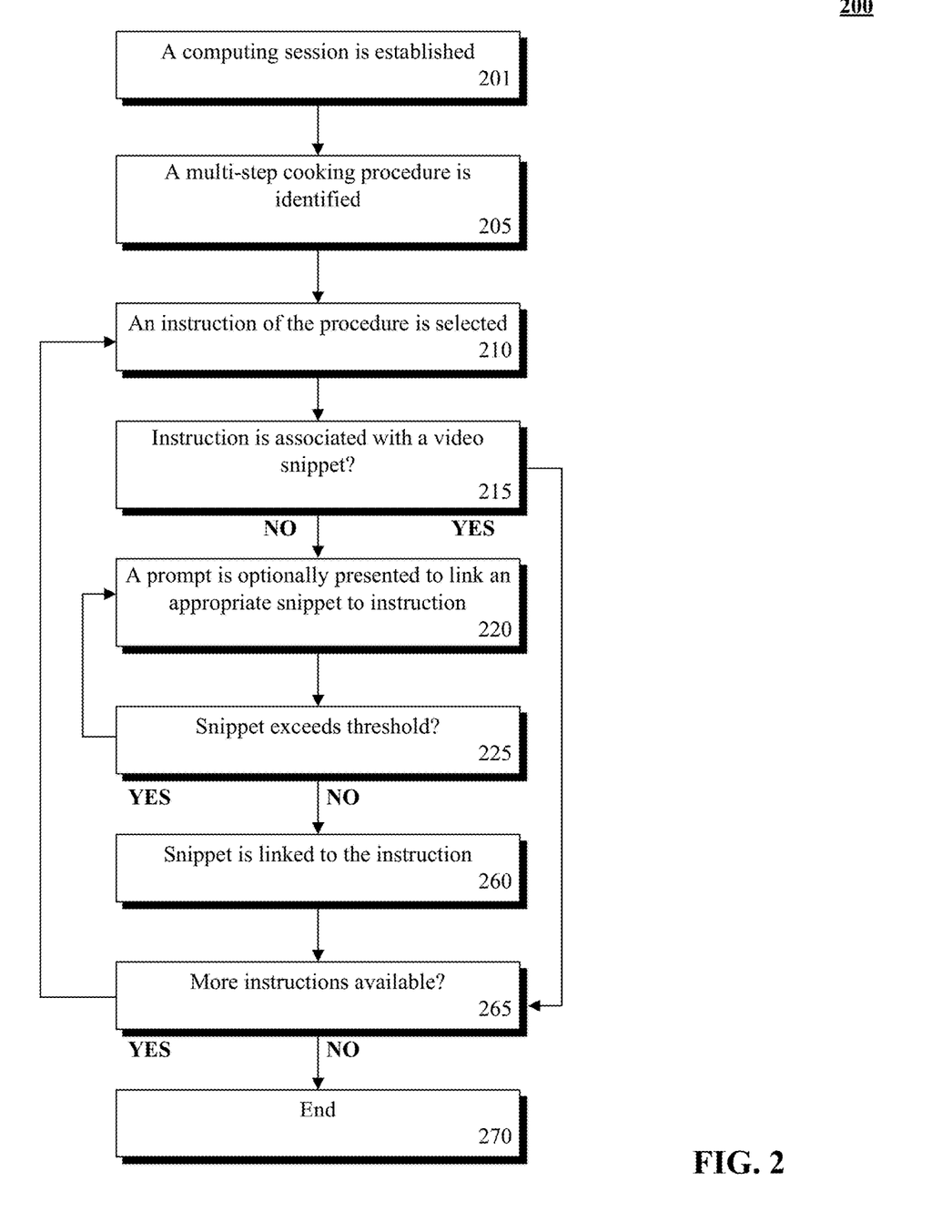
FIG. 2 is a schematic diagram illustrating a method for linking a video snippet to an individual instruction of a multi-step procedure in accordance with an embodiment of the inventive arrangements disclosed herein.

FIG. 2 is a schematic diagram illustrating a method 200 for linking video snippets to individual steps of a multi-step procedure in accordance with an embodiment of the inventive arrangements disclosed herein. Method 200 can be performed in the context of scenario 110, 150, and/or system 300.

In step 201, a computing session can be established. In step 205, a multi-step cooking procedure can be identified. In step 210, an instruction of the procedure can be selected. The instruction can be manually and/or automatically selected. In step 215, if the instruction is associated with a video snippet, the method can proceed to step 265, else continue to step 220. In step 220, a link can be optionally presented to link the instruction with a video snippet. In step 225, if the snippet exceeds a previously established threshold, the method proceeds back to step 220. If, in step 225, the snippet does not exceed the threshold, step 260 is executed. In one embodiment, the threshold can be manually and/or automatically established. In step 260, the snippet is linked to the instruction. In one embodiment, the link can be a file pointer to a video stored within a data store. In step 265, if more instruction are available, the method can return to step 210, else continue to step 270. In step 270, the method can end.

Drawings presented herein are for illustrative purposes only and should not be construed to limit the invention in any regard. It should be appreciated that steps of method 200 can be performed in real-time or near real-time. Method 200 steps can be performed in serial and/or in parallel.

Figure 3:
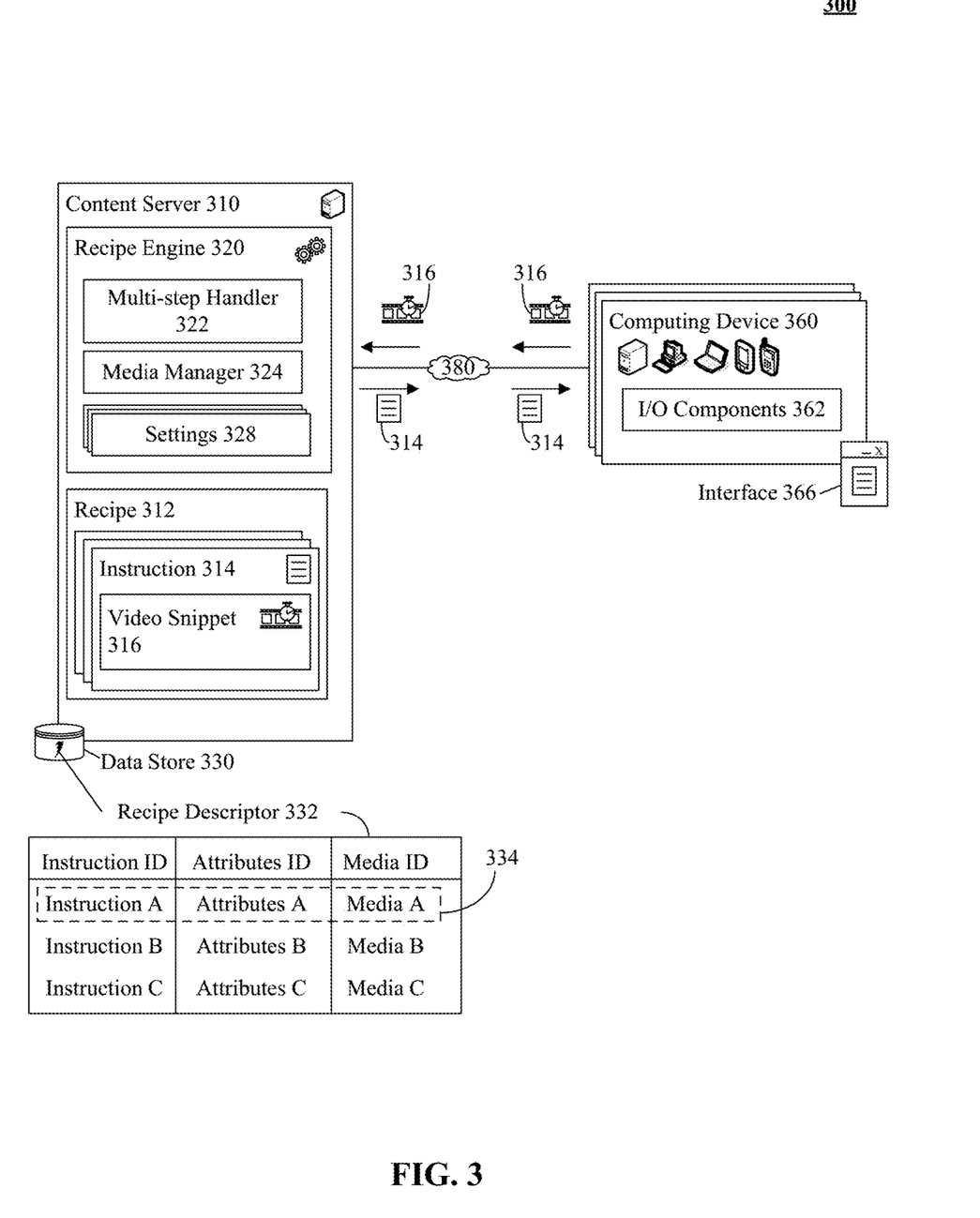
FIG. 3 is a schematic diagram illustrating a system for linking a video snippet to an individual instruction of a multi-step procedure in accordance with an embodiment of the inventive arrangements disclosed herein.

FIG. 3 is a schematic diagram illustrating a system 300 for linking video snippets to individual steps of a multi-step procedure in accordance with an embodiment of the inventive arrangements disclosed herein. System 300 can be performed in the context of scenario 110, 150, and/or method 200. In system 300, a video snippet 316 can be conveyed to a content server 310 and/or conveyed from a content server 310. In one embodiment, instructions of recipe 312 can be conveyed to a computing device 360. In the embodiment, video snippet 316 can be included within the instruction. In another configuration of the embodiment, a pointer to a video snippet 316 can be included within the instruction. For example, a Uniform Resource Locator (URL) can be an attribute of an instruction which can identify a unique video snippet 316 associated with an instruction 314.

Content server 310 can be a hardware/software entity for executing a procedure engine 320. Server 310 functionality can include, but is not limited to, load balancing, file sharing, and the like. Server 310 can include, but is not limited to, procedure engine 320, procedure 312, data store 330, and the like. In one instance, server 310 can include, but is not limited to, a repository, a gateway server, and the like.

Recipe engine 320 can be a hardware/software element for enabling a linked video snippet within a step of a multi-step procedure 312. Engine 320 can include, but is not limited to, a multi-step handler 322, a media manager 324, settings 328, and the like. Engine 320 functionality can include, but is not limited to, notification capabilities, account management, and the like. In one embodiment, engine 320 can automatically analyze a recipe and determine relevant video segments of a video which can be linked to the instructions of the recipe. In the embodiment, video metadata (e.g., chapter markers, subtitles) can be utilized to link an instruction with a video segment. For example, subtitles can be utilized to word match instructions to an audio track of the video to determine start and end portions for a video segment to be linked to the instruction.

In one embodiment, recipe engine 320 can include traditional and/or proprietary input mechanisms. For example, engine 320 can permit barcodes to be scanned (e.g., from a barcode scanner/camera of device 360) and products from a food inventory system can be presented. In one instance, an algorithm can be utilized to track user habits including, but not limited to, brands purchased, frequency of purchases, activity level (e.g., type of exercise, duration). For example, the algorithm can determine the shelf life and frequency that the product is purchased to alert the user when an ingredient is near its expiration date or when the ingredient has been almost used out. In one embodiment, recipes can be conveyed to users (e.g., automatic search, manual search) based on a selected ingredient or set of ingredients. For example, when a user selects a cake batter ingredient, a set of cake recipes can be automatically presented or emailed to the user's email account (e.g., hyperlinks to recipes).

In another embodiment, recipe engine 320 can support price alerts to enable automated purchasing of selected items. In the embodiment, a price setting can be established by a user for one or more items. In the embodiment, when the item is at (e.g., below, above) the established price, the item can be automatically purchased via a programmatically executed payment process (e.g., user's credit card of the user account). In one instance, the user can be automatically notified of item purchase via one or more traditional and/or proprietary mechanisms including, but not limited to, email, SMS, in-app notification, and the like.

Multi-step handler 322 can be a hardware/software entity for permitting a linked video snippet within an instruction of a multi-step procedure 312. Handler 322 functionality can include, but is not limited to, procedure 312 analysis, instruction 314 identification, and the like. In one instance, handler 322 can be utilized to generate procedure descriptor 332 from a procedure 312. In the instance, handler 322 can employ traditional and/or proprietary list analysis.

Media manager 324 can be a hardware/software element for associating a video snippet with an instruction 314 of a multi-step procedure 312. Manager 324 functionality can include, but is not limited to, snippet 316 processing, snippet 316 management, and the like. In one embodiment, the manager 324 can permit user selection of a video segment within a video stream. In the instance, manager 324 can utilize traditional and/or proprietary mechanisms for permitting user selection of the video segment. That is, a single video can be utilized by enabling linking of discrete portions of the video to distinct instructions 314 of the recipe 312. In one instance, manager 324 can permit selection of start and end indices for video segments.

Settings 328 can be a set of options for configuring the behavior of system 300, sever 310, and/or engine 320. In one instance, settings 328 can include, but is not limited to, engine 320 settings, multi-step handler 322 options, media manager 324 options, and the like. It should be appreciated that settings 328 can be manually and/or automatically established. Settings 328 can be presented within interface 366, an interface communicatively linked to server 310, and the like.

Recipe 312 can be an ordered data set associated with a culinary recipe. Recipe 312 can include, but is not limited to, instructions 314, metadata, and the like. In one instance, recipe 312 can be associated with a recipe descriptor 332. In the instance, descriptor 332 can be a data set for linking a video snippet to an instruction 314. In one embodiment, recipe 312 can conform to traditional and/or proprietary microformats. In the embodiment, the microformat can include, but is not limited to, hRecipe, an Extensible Markup Language derived microformat, and the like. Instruction 314 can be a data element describing an action associated with performing a portion of a recipe. Instruction 314 can include, but is not limited to, an alphabetical element, an alphanumeric element, and the like.

Video snippet 316 can be a digital artifact for recording, copying, playback, broadcasting, and display of moving visual media. Snippet 316 can conform to traditional and/or proprietary digital formats including, but not limited to, Motion Picture Experts Group (MPEG), Audio Video Interleave (AVI), APPLE QUICKTIME, H.264 and the like. In one instance, snippet 316 can be a video file with metadata indicating a specific portion of the video to be linked to the instruction 314.

Recipe descriptor 332 can be a data set for enabling a video snippet 316 to be linked to an instruction 314. Descriptor 332 can include, but it not limited to, an instruction identifier, an attribute identifier, a media identifier, and the like. In one embodiment, descriptor 332 can be manually and/or automatically generated. In one instance, descriptor 332 can link a video identifier to an instruction. For example, a Media A can be linked to an Instruction A in entry 334. In one instance, attributes associated with an instruction can include, but is not limited to, descriptors, permissions, visibility options, and the like.

Data store 330 can be a hardware/software component able to persist settings 328, recipe 312, and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to server 310 in one or more traditional and/or proprietary mechanisms. In one instance, data store 330 can be a component of Structured Query Language (SQL) complaint database.

Computing device 360 can be a hardware/software for presenting recipe 312 and/or video snippet 316. Device 360 can include, but is not limited to, input/output components 362, camera, microphone, interface 366, a keyboard, a mouse, an accelerometer, a biometric sensor, and the like. Computing device 360 can include, but is not limited to, a desktop computer, a laptop computer, a tablet computing device, a personal digital assistant (PDA), a mobile phone, and the like. Interface 366 can be a user interactive component permitting interaction and/or presentation of recipe 312, instruction 314, and/or video 316. Interface 366 capabilities can include a graphical user interface (GUI), voice user interface (VUI), mixed-mode interface, and the like. In one instance, interface 336 can be communicatively linked to computing device 360.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that one or more components within system 300 can be optional components permitting that the disclosure functionality be retained. It should be understood that engine 320 components can be optional components providing that engine 320 functionality is maintained. It should be appreciated that one or more components of engine 320 can be combined and/or separated based on functionality, usage, and the like. System 300 can conform to a Service Oriented Architecture (SOA), Representational State Transfer (REST) architecture, and the like. It should be appreciated that snippet 316 playback functionality can conform to traditional and/or proprietary playback modes including, but not limited to, repeat, pause, stop, fast forward, rewind, and the like. In one embodiment, snippet 316 playback (e.g., pause/resume) can be triggered based on device 360 orientation changes (e.g., landscape, portrait), user eye tracking, and the like. For example, snippet 316 playback can be automatically paused when a user looks away from a phone presenting snippet 316.

In one instance, the engine 320 can support lifestyle eating habits such as providing information about caloric content, protein content, and the like. For example, a barcode of an item can be scanned and based on a user selection of exercise (e.g., running swimming), a duration or intensity can be presented to indicate how long it would take for the user to burn the caloric content of the item.

Figure 4:
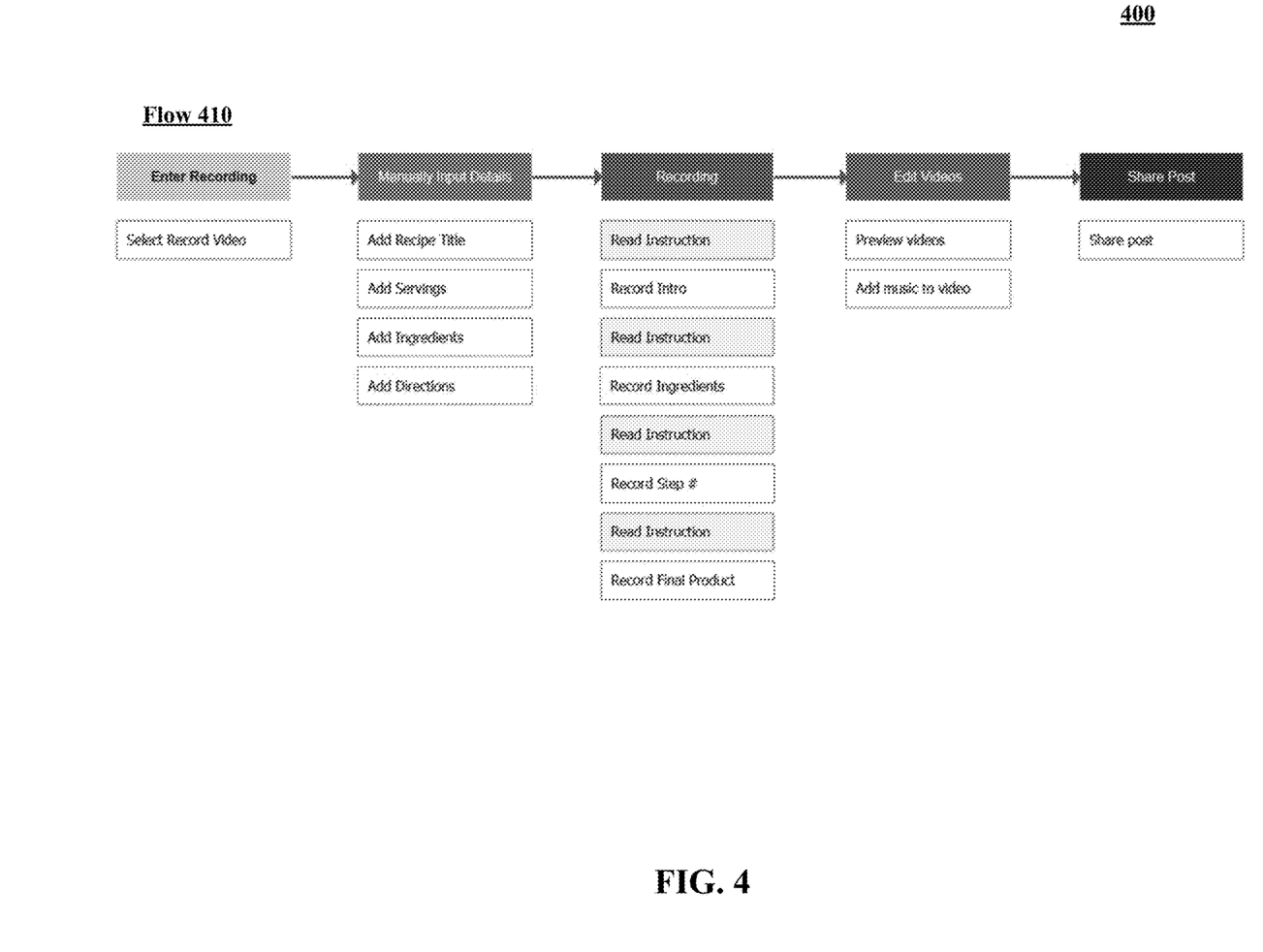
FIG. 4 is a schematic diagram illustrating a flow for linking a video snippet to an individual instruction of a multi-step procedure in accordance with an embodiment of the inventive arrangements disclosed herein.

FIG. 4 is a schematic diagram illustrating a flow 410 for linking a video snippet to an individual instruction of a multi-step procedure in accordance with an embodiment of the inventive arrangements disclosed herein. Flow 410 illustrates an exemplary implementation of a recording functionality for a snippet within a multi-step procedure. Flow 410 can include, but is not limited to, serial execution, parallel execution, looped execution, and the like. In one instance, flow 410 can permit recording of a snippet associated with a recipe, snippet editing, snippet sharing (e.g., social media), and the like.

Figure 5:
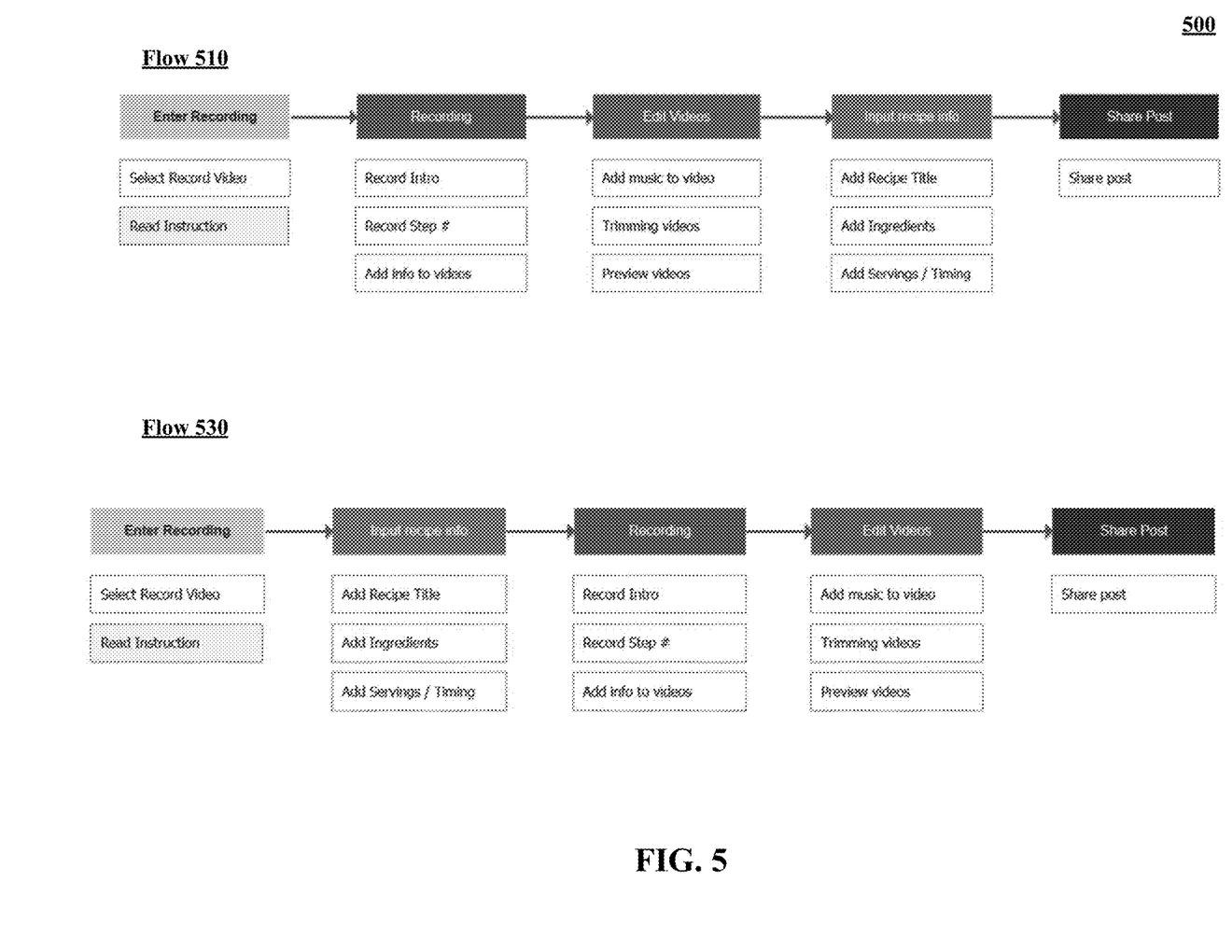
FIG. 5 is a schematic diagram illustrating a set of flows for linking a video snippet to an individual instruction of a multi-step procedure in accordance with an embodiment of the inventive arrangements disclosed herein.

FIG. 5 is a schematic diagram illustrating a set of flows 510, 530 for linking a video snippet to an individual instruction of a multi-step procedure in accordance with an embodiment of the inventive arrangements disclosed herein. Flow 510, 530 illustrates an exemplary implementation of a recording functionality for a snippet within a multi-step procedure. Flow 510, 530 can include, but is not limited to, serial execution, parallel execution, looped execution, and the like. In one instance, flow 510, 530 can permit recording of a snippet associated with a recipe, snippet editing, snippet sharing (e.g., social media), and the like. It should be appreciated that flow 510, 530 steps can differ to enable ordering of recording prior to recipe input or after recipe input.

Figure 6:
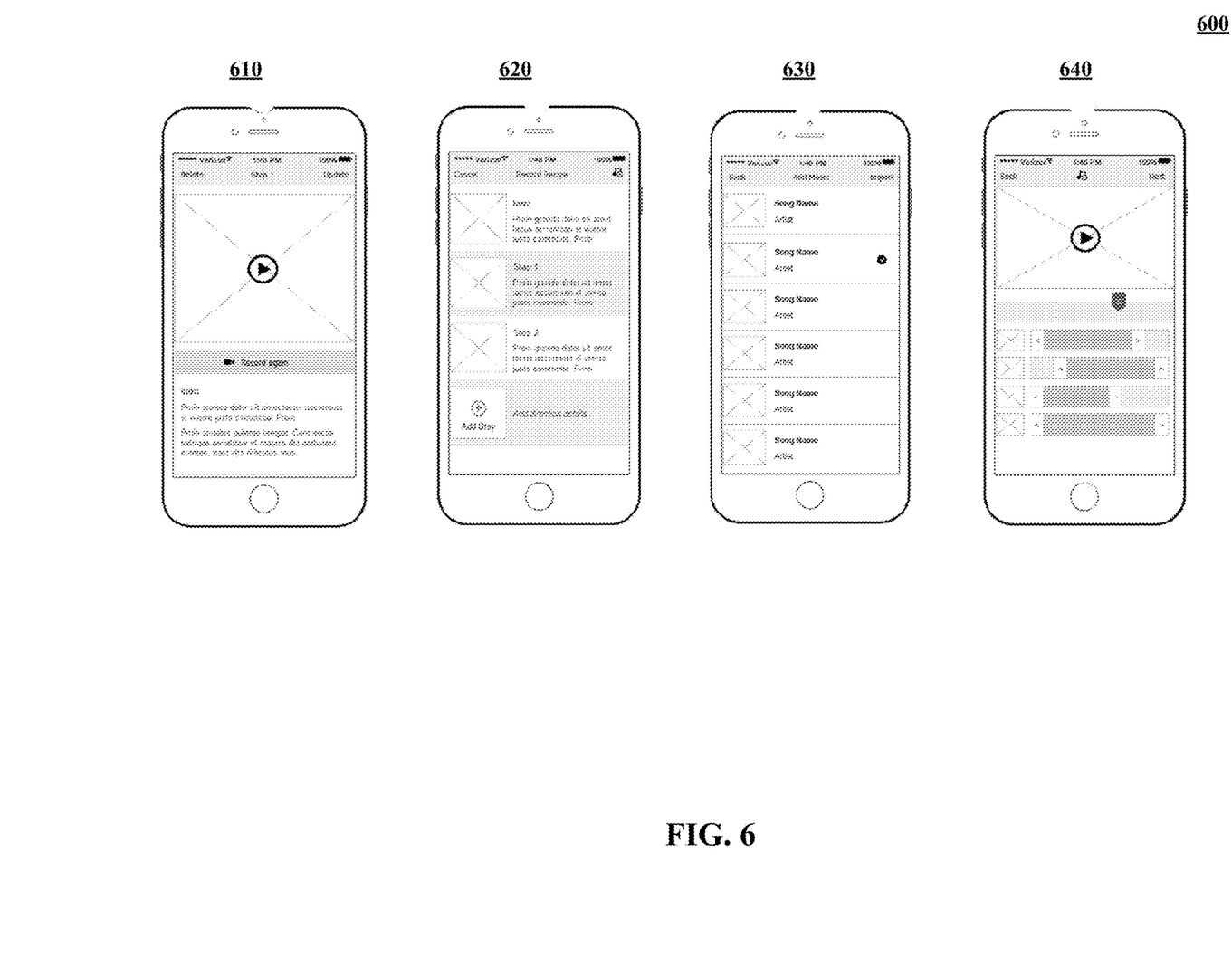
FIG. 6 is a schematic diagram illustrating a set of interfaces for linking a video snippet to an individual instruction of a multi-step procedure in accordance with an embodiment of the inventive arrangements disclosed herein.

FIG. 6 is a schematic diagram illustrating a set of interfaces 610-640 for linking a video snippet to an individual instruction of a multi-step procedure in accordance with an embodiment of the inventive arrangements disclosed herein. Interfaces 610-640 illustrate a set of exemplary interface of a recording functionality for a snippet within a multi-step procedure. Interface 610 can include a set of interface elements for presenting a snippet preview and/or playback. In one instance, interface 610 can include a thumbnail preview, a description, and the like. Interface 620 can include a set of interface elements for presenting a set of snippets and/or recording a snippet associated with a recipe. Interface 630 can include a set of interface elements for adding a music soundtrack to a snippet associated with a step of a recipe. Interface 640 can include a set of interface elements for editing a video snippet. Editing can include non-linear video editing, linear video editing, sound editing, and the like. In one embodiment, a thumbnail preview of the snippet or recipe can be selected from one or more sliders associated with a video/auditing capability. For example, a slider associated a video file can be moved to select a video frame of the video which can be dragged and dropped into a thumbnail preview image box for the recipe.

The flowchart and block diagrams in the FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for video snippets within a multi-step procedure comprising:

identifying, via a computing device comprising hardware and circuitry, an instruction of a multi-step procedure, wherein the instruction is a directive for performing an action associated with the multi-step procedure, wherein the multi-step procedure is a cooking recipe comprising an ordered set of instructions, wherein the instruction comprises text, providing words detailing the instruction;

presenting, via the computing device, within a graphical user interface (GUI) each separate one of the steps of the multi-step procedure by providing a text field showing a respective one of the text for the instruction of the respective within the GUI, wherein the GUI provides a user selectable option to designate a video segment that corresponds to a selected one of the respect steps of the multi-step procedure;

receiving, via the computing device, a user selection of the selected one of the steps of the multi-step procedure;

responsive to the user selection, selecting, via the computing device, a user selected video segment via the GUI that is stored within a data store, wherein the user selected video segment is a discrete video file for the respective step that comprises of a start index and an end index unique to the video segment, wherein the time difference between the start index and end index conforms to a previously established length threshold, wherein the length of the previously established length threshold is a duration of five seconds ensuring the video segment is five seconds or less;

checking, via the computing device, a duration of the user selected video segment determine if the user selected video segment exceeds the previously established length threshold;

when the length threshold is exceeded per the checking, prompting, via the computing device, the user to select a shorter video segment until one having a duration less than or equal to the previously established length threshold is selected;

once the user selected video segment has been checked as not exceeding the previously established length threshold, linking, via the computing device, the discrete video file of the video segment to the respective step and to the respective text of the respective instruction of the multi-step procedure, wherein the linking, by the computing device, comprises creating of a pointer to the discrete video file and storing the text of the respective step, wherein the pointer and the stored text is stored within a non-transitory computer readable medium indexed against the respective step of the multi-step procedure; and repeating, via the computing device, the presenting, receiving, selecting, checking and linking steps for at an additional one of the steps of the multi-step procedure, wherein the method permits future accessing of the stored multi-step process to be presented in an accessing user's GUI by step, wherein for each step, the user's accessing GUI provides an option to playback the discrete video file if any stored for that respect step of the multi-step procedure.

2. The method of claim 1, further comprising:
for each instruction of the multi-step procedure, providing, via the GUI of the computing device, a set of screens, one per instruction of the multi-step procedure, wherein each screen of the set of screens is presented with information for only a respective one of the instructions and a respective one of the steps, wherein each screen of the set of screens includes the user selectable option to designate a video segment that corresponds to a selected one of the respect steps, and includes a navigation option to progress to a respective one of the set of screens corresponding to a next ordered step in the multi-step procedure.

3. The method of claim 1, further comprising:
prompting a user within a user interface to perform a selection of at least one of the start index and end index.

4. The method of claim 1, wherein the video conforms to at least one of a Motion Picture Experts Group (MPEG) 4 format, an H.264 format, and an APPLE QUICKTIME format.

5. The method of claim 1, further comprising:
receiving a selection of an instruction associated with the multi-step procedure; and
presenting a user interface for identifying at least a segment of a video and a video within a data store.

6. The method of claim 1, wherein a plurality of instructions of the multi-step procedure is linked to a plurality of video segments of the video.

7. The method of claim 1, further comprising:
analyzing a multi-step procedure to determine at least one instruction;
programmatically determining a video segment of the video corresponding to the instruction.

8. The method of claim 7, further comprising:
automatically associating a pointer to the video segment of the video with the instruction of the multi-step procedure.

9. The method of claim 8, wherein the pointer is a Uniform Resource Identifier (URI).

10. A system for video snippets within a multi-step procedure comprising:
a recipe engine, comprising hardware and circuitry, able to identify a recipe within an electronic computer readable medium, wherein the recipe is an ordered set of instructions, wherein the engine is configured to link a video segment of a digital video to an instruction of the recipe, wherein the linking comprises of a pointer to the video and the video segment, wherein the pointer is within a computer readable medium,
multi-step handler, comprising hardware and circuitry, configured to identify an instruction of a multi-step procedure, wherein the instruction is a directive for performing an action associated with the procedure, wherein the multi-step procedure is a cooking recipe comprising an ordered set of instructions;
a media manager, comprising hardware and circuitry, configured to select a video segment within a data store, wherein the segment comprises of a start index and an end index, wherein the time difference between the start index and end index conforms to a previously established length threshold, wherein the threshold is a duration of five seconds; and
a data store, comprising a non-transitory storage device, configured to persist at least one of a recipe and the video.

11. The system of claim 10,
hardware and circuitry to check a duration of all video handled by the media manager to determine if the user selected video segment exceeds the previously established length threshold, wherein the system; and
hardware and circuitry to when the length threshold is exceeded per the check of duration, prompt, to select a shorter video segment until one having a duration less than or equal to the previously established length threshold is selected.

12. The system of claim 10, wherein the engine is a functionality of a mobile application executing within a mobile computing device.

13. The system of claim 10, wherein the engine is a functionality of a Web-based service.

14. The system of claim 10, wherein the pointer is at least one of a Uniform Resource Identifier (URI) and a memory address.

15. The system of claim 10, wherein the video conforms to at least one of a Motion Picture Experts Group (MPEG) 4 format, an H.264 format, and an APPLE QUICKTIME format.

16. The system of claim 11,
hardware and circuitry for providing a GUI with a set of screens, one per instruction of the multi-step procedure, wherein each screen of the set of screens is configured to be presented with information for only a respective one of the instructions and a respective one of the steps, wherein each screen of the set of screens includes the user selectable option to designate a video segment that corresponds to a selected one of the respect steps, and wherein each screen also includes a navigation option to progress to a respective one of the set of screens corresponding to a next ordered step in the multi-step procedure.

17. The system of claim 10, wherein the engine is configured to prompt a user within a user interface to perform a selection of at least one of the start index and end index.

18. The system of claim 10, wherein the engine is configured to automatically associate a pointer to the video segment of the video with the instruction of the multi-step procedure.

19. The system of claim 10, further comprising:
the engine able to analyze a multi-step procedure to determine at least one instruction; and
the engine able to programmatically determine a video segment of the video corresponding to the instruction.

20. A computer program product comprising a non-transitory computer readable storage medium having computer usable program code embodied therewith, the computer usable program code comprising:
computer usable program code stored in a storage medium, if said computer usable program code is executed by a processor it is operable to identify an instruction of a multi-step procedure, wherein the instruction is a directive for performing an action associated with the procedure, wherein the multi-step procedure is a cooking recipe comprising an ordered set of instructions;

computer usable program code stored in a storage medium, if said computer usable program code is executed by a processor it is operable to select a video segment within a data store, wherein the segment comprises of a start index and an end index, wherein the time difference between the start index and end index conforms to a previously established length threshold, wherein the length of the previously established length threshold is a duration of five seconds ensuring the video segment is five seconds or less;

computer usable program code stored in a storage medium, if said computer usable program code is executed by a processor it is operable to, once the user selected video segment has been checked as not exceeding the previously established length threshold, link the video segment of the video to the instruction of the multi-step procedure, wherein the linking comprises of a pointer to the video and the video segment, wherein the pointer is within a computer readable medium;

computer usable program code stored in a storage medium, if said computer usable program code is executed by a processor it is operable to check a duration of the user selected video segment determine if the user selected video segment exceeds the previously established length threshold;

computer usable program code stored in a storage medium, if said computer usable program code is executed by a processor it is operable to, when the length threshold is exceeded per the checking, prompt, via the computing device, the user to select a shorter video segment until one having a duration less than or equal to the previously established length threshold is selected; and computer usable program code stored in a storage medium, if said computer usable program code is executed by a processor it is operable to repeat, via the computing device, execution of code to present, receive, select, check and link for at an additional one of the steps of the multi-step procedure, wherein the method permits future accessing of the stored multi-step process to be presented in an accessing user's GUI by step, wherein for each step, the user's accessing GUI provides an option to playback the discrete video file if any stored for that respect step of the multi-step procedure.

\* \* \* \* \*